US008491263B1

(12) United States Patent
Liang

(10) Patent No.: US 8,491,263 B1

(45) Date of Patent: Jul. 23, 2013

(54) TURBINE BLADE WITH COOLING AND SEALING

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 357 days.

(21) Appl. No.: 12/820,164

(22) Filed: Jun. 22, 2010

(51) Int. Cl.
*B64C 11/24* (2006.01)

(52) U.S. Cl.
USPC ......... 416/92; 416/97 R; 416/193 R; 416/232

(58) Field of Classification Search
USPC .................... 416/92, 96 R, 97 R, 193 R, 232, 416/226; 415/115, 116, 173.1
See application file for complete search history.

(56) References Cited

U.S. PATENT DOCUMENTS

| | | | | |
|---|---|---|---|---|
| 5,720,431 | A * | 2/1998 | Sellers et al. | 416/97 R |
| 2005/0244270 | A1* | 11/2005 | Liang | 416/97 R |
| 2005/0281674 | A1* | 12/2005 | Liang | 416/97 R |
| 2009/0232661 | A1* | 9/2009 | Ryznic | 416/97 R |
| 2011/0243717 | A1* | 10/2011 | Gleiner et al. | 415/177 |

* cited by examiner

*Primary Examiner* — Edward Look
*Assistant Examiner* — Juan G Flores
(74) *Attorney, Agent, or Firm* — John Ryznic

(57) ABSTRACT

A turbine rotor blade with a thin thermal skin bonded to a spar to form a near-wall cooled blade, the blade having a near-wall cooling circuit formed by plurality of multiple pass serpentine flow cooling circuits that have cooling channels formed within the airfoil walls and the platform, and with a row of cooling air exit slots that connect to the last leg of the serpentine flow cooling channels and open onto an upstream side of the tip edge so that cooling air is discharged to form a blockage for the blade tip. The airfoil walls include radial extending cooling channels that form the airfoil legs of the serpentine cooling circuits.

10 Claims, 7 Drawing Sheets view B-B

TURBINE BLADE WITH COOLING AND SEALING

GOVERNMENT LICENSE RIGHTS

None.

CROSS-REFERENCE TO RELATED APPLICATIONS

None.

BACKGROUND OF THE INVENTION

1. Field of the Invention

The present invention relates generally to gas turbine engine, and more specifically to turbine rotor blade with integrated cooling and sealing for use in a gas turbine engine.

2. Description of the Related Art Including Information Disclosed Under 37 CFR 1.97 and 1.98

A gas turbine engine, such as a large frame heavy duty industrial gas turbine (IGT) engine, includes a turbine with one or more rows of stator vanes and rotor blades that react with a hot gas stream from a combustor to produce mechanical work. The stator vanes guide the hot gas stream into the adjacent and downstream row of rotor blades. The first stage vanes and blades are exposed to the highest gas stream temperatures and therefore require the most amount of cooling.

The efficiency of the engine can be increased by using a higher turbine inlet temperature. However, increasing the temperature requires better cooling of the airfoils or improved materials that can withstand these higher temperatures. Turbine airfoils (vanes and blades) are cooled using a combination of convection and impingement cooling within the airfoils and film cooling on the external airfoil surfaces.

In the prior art, near wall cooling utilized in an airfoil mid-chord section is constructed with radial flow channels plus resupply holes in conjunction with film discharge cooling holes. As a result of this cooling design, spanwise and chordwise cooling flow control due to the airfoil external hot gas temperature and pressure variation is difficult to achieve. In addition, single radial channel flow is not the best method of utilizing cooling air resulting in a low convective cooling effectiveness. The dimension for the airfoil external wall has to fulfill the casting requirement. An increase in the conductive path will reduce the thermal efficiency for the blade mid-chord section cooling. FIG. 1 shows a cut-away view of a prior art turbine blade with near wall cooling. FIG. 2 shows a cross sectional view of the blade with two radial flow cooling channels in the pressure side and suction side walls. The blade mid-chord section is cooled using multiple single pass radial flow channels 11 each having an oval cross sectional shape. Film cooling holes 12 connect the radial channels 11 to the external surfaces of the airfoil. Cooling air from one or more cooling air supply channels 13 formed within the airfoil through resupply holes 14 and into the radial channels 11. In the design of FIGS. 1 and 2, the cooling through flow velocity as well as the internal heat transfer coefficient is comparatively reduced. Subsequently, refresh holes along the internal wall of the radial flow channel is used to replenish the cooling flow.

BRIEF SUMMARY OF THE INVENTION

A turbine rotor blade for a gas turbine engine, the blade includes a near-wall multiple integrated serpentine flow cooling circuitry for a hollow turbine blade with cooling and tip sealing that can be used with a blade having a thin thermal skin construction, especially for a blade that requires platform cooling and a radial tip discharge cooling application. The blade cooling and sealing design of the present invention will greatly reduce the airfoil metal temperature and therefore reduce the airfoil cooling flow requirement and improved turbine efficiency.

The blade cooling circuitry includes multiple triple pass or five-pass serpentine flow cooling circuits with legs that form radial flow channels in the airfoil walls and legs that extend within the platform to provide cooling for both the airfoil walls and the platforms. The serpentine flow cooling circuits then discharge the cooling air out through slanted blade tip exit slots in a direction of the hot gas flow leakage across the blade tip.

DETAILED DESCRIPTION OF THE INVENTION

For a blade cooled with the radial flow channels, the near-wall radial flow channels at the tip discharge section experiences an external cross flow effect. As a consequence of this, an over-temperature occurs at the locations of the blade pressure tip regions. This external cross flow effect on near-wall radial flow channel is caused by the non-uniformity of the radial channel discharge pressure profile and the blade tip leakage flow across the radial channel exit location.

Figure 1:
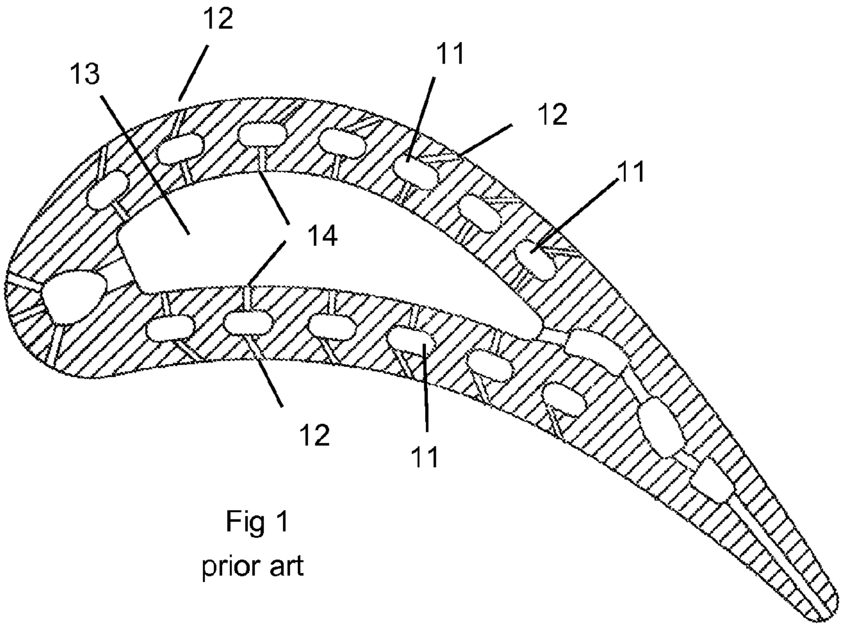
Fig 1 prior art
FIG. 1 shows a prior art turbine rotor blade with a number of single pass radial cooling channels formed along the airfoil walls.
Figure 2:
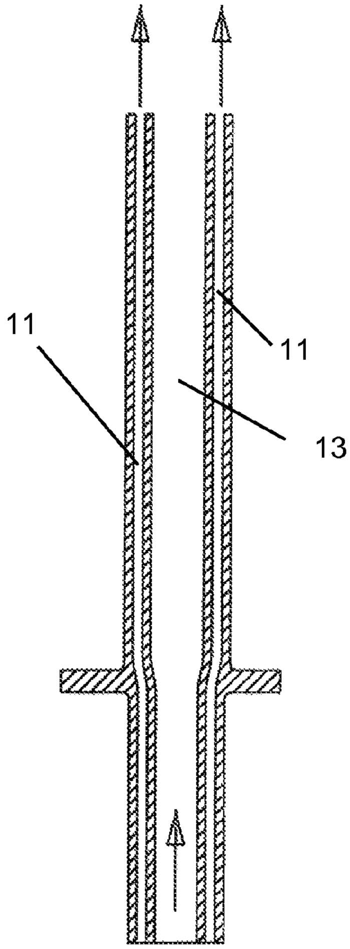
Fig 2 prior art
FIG. 2 shows a cross section view of the blade in FIG. 1 with two single pass radial cooling channels formed in the walls on the pressure side and suction side.
Figure 3:
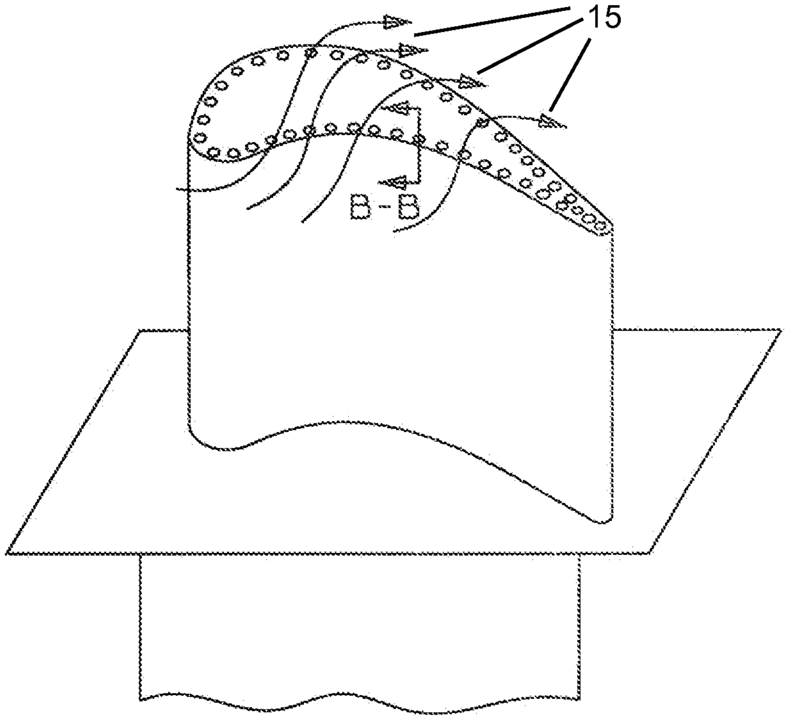
FIG. 3 shows a schematic view of a rotor blade with the single pass radial flow channels and a secondary flow path of the hot gas stream interacting with the cooling air discharged from the radial channels.
Figure 4:
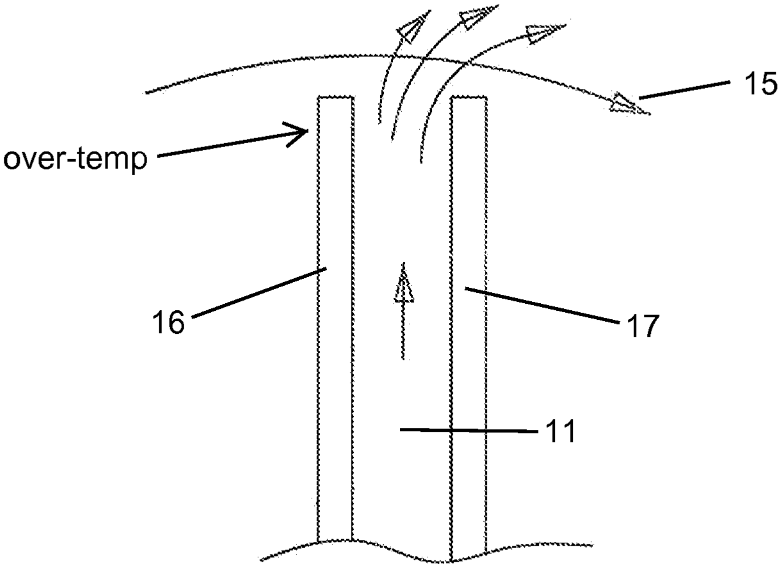
FIG. 4 shows a cross section view through line B-B in FIG. 3.

The blade tip leakage flow problem and cooling channel external cooling mal-distribution issue can be reduced or eliminated using the blade sealing and cooling design of the present invention into the blade near-wall radial cooling slot design. FIG. 3 shows a cross sectional view of the blade mid-chord section flow channel with cooling flow mal-distribution and the hot gas leakage flow interaction that occurs across the channel exit section. A number of the radial near wall cooling channels are shown opening onto the blade tip and the secondary flow path 15 that flows over the discharge of the radial channels as also seen in FIG. 4. In FIG. 4, the radial flow cooling channel 11 is formed by the external wall 16 that is exposed to the hot gas stream and the inner wall 17 that defines the cooling air supply channel 13. With this prior art design, an over-temperature occurs at the location labeled in FIG. 4.

An improvement for the airfoil near-wall cooling and tip sealing can be achieved with the cooling and sealing geometry of the present invention incorporated into the prior art airfoils with the near-wall cooling designs. The near-wall multiple integrated serpentine flow cooling circuit of the present invention is used with a thermal skin construction for the turbine blade. Multiple multi-pass serpentine cooling flow circuits are used throughout the entire blade spar. The multiple integrated triple pass serpentine cooling circuits are formed in parallel with either a forward flowing or an aft flowing formation (aft flowing is from the leading edge to the trailing edge of the blade). They can be formed with three or five serpentine flow legs depending upon the height of the blade. Individual multiple integrated serpentine flow channels are designed based on the airfoil gas side pressure distribution for both the airfoil and the platform. Also, each individual multiple integrated serpentine flow circuit can be designed based on the airfoil or platform local external heat load to achieve a desired local metal temperature so that no surface of the blade (including the airfoil and the platform) will exceed a certain metal temperature that can induce erosion or other high temperature induced damage. With the cooling circuit of the present invention, a maximum use of cooling air for a given airfoil inlet gas temperature and pressure profile can be achieved. In addition, the multiple multi-pass cooling air in the serpentine flow channels yields a higher internal convection cooling effectiveness than in the prior art single pass radial flow channels.

Figure 5:
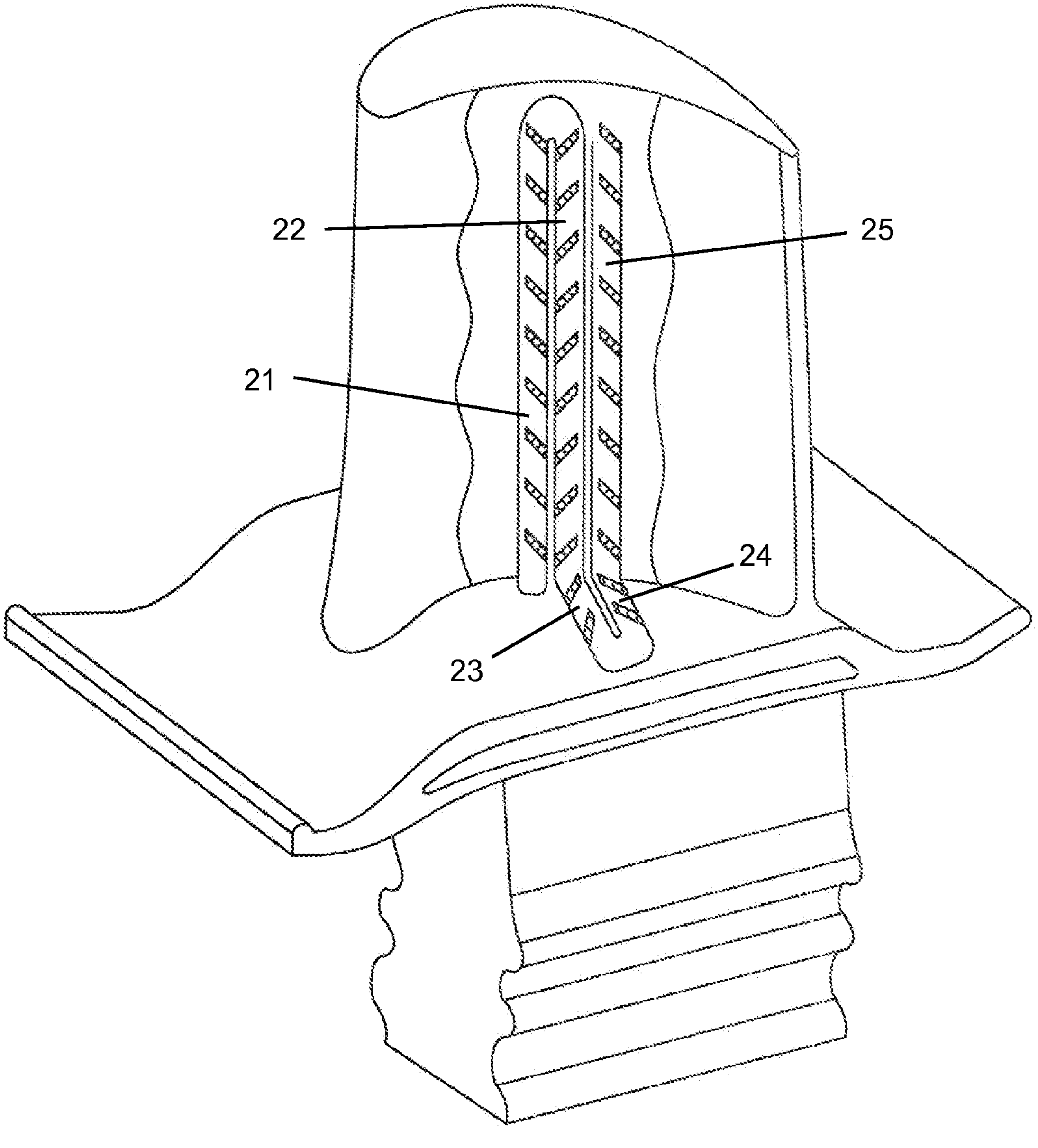
FIG. 5 shows a schematic view of a turbine blade of the present invention with a cut-away view of one of the multiple pass serpentine flow circuits formed within the airfoil and the platform of the blade.

FIG. 5 shows a turbine rotor blade with an airfoil extending from a platform, and with a cut-away view showing one of the multi-pass serpentine flow cooling circuits used in the blade to provide cooling for the airfoil walls and the platform. In the FIG. 5 embodiment, the cooling circuit is a triple pass (3-pass) serpentine flow cooling circuit with the three main legs (21, 22, 25) formed within the airfoil wall and two sub-legs (23, 24) extending into the platform between the second leg 22 and the third leg 23 of the multiple serpentine flow circuit. For purposes of this disclosure, the main legs of the multiple serpentine flow circuit will be those legs formed within the airfoil walls, while the sub-legs will be those legs formed within the platform. The FIG. 5 embodiment is considered to be a triple pass integrated aft flowing serpentine flow circuit because of the three main legs formed within the airfoil wall, even though the overall circuit includes two legs from the platform to form a five-leg serpentine flow cooling circuit as distinguished from the triple pass integrated aft flowing serpentine flow circuit.

Figure 6:
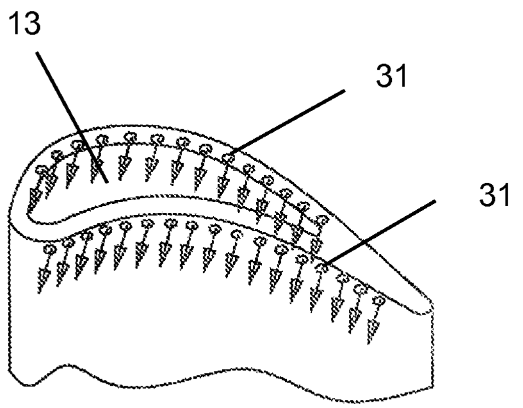
FIG. 6 shows a cross section view of blade of the present invention from a top end on the pressure wall side.
Figure 7:
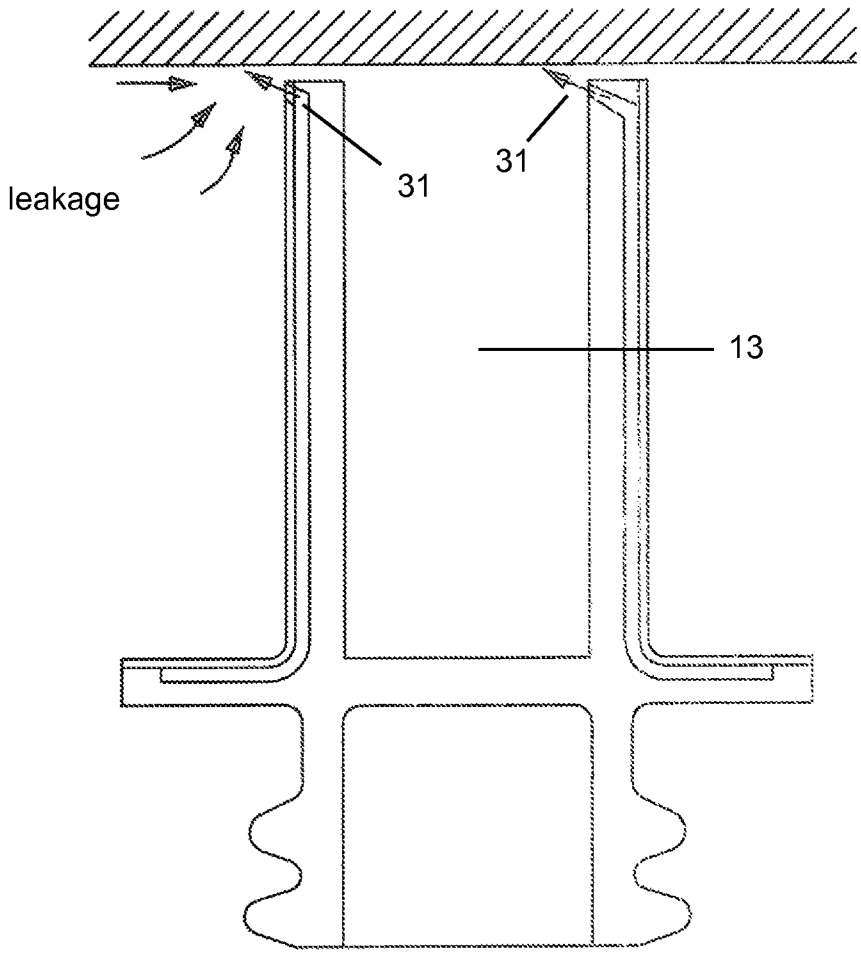
FIG. 7 shows a cross section view through a slice of the blade of the present invention showing the cooling channels along the airfoil walls and the platforms.

FIG. 6 shows a view of the turbine blade with the hollow cavity 13 and the arrangement of cooling air exit slots 31 that open on a side of the pressure side wall and the suction side wall of the blade to discharge the cooling air from the multiple serpentine flow circuits. The exit slots are on the side of the walls that the hot gas flow leakage will flow to as seen by the arrows in FIG. 7.

Figure 8:
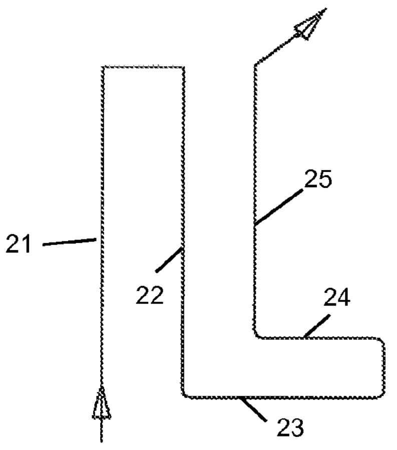
FIG. 8 shows a flow diagram for a triple pass integrated aft flowing serpentine flow circuit used in the blade of the present invention.

FIG. 8 shows a diagram view of the flow for a triple pass integrated aft flowing serpentine flow circuit. This circuit would include a radial channel in the airfoil wall that forms a first main leg 21 of the serpentine circuit and flows upward from the platform to the tip, a second main leg 22 adjacent to the first main leg that flows downward from tip to platform, a third leg 23 that forms a first sub-leg that flows out and into the platform, a fourth leg 24 or second sub-leg that flows along the platform and back into the airfoil walls, and a fifth leg 25 or third main leg that is a radial channel in the airfoil wall that flows from platform to the tip and discharges out through a cooling air exit slot or hole 31. The multiple pass serpentine flow cooling circuit that includes these five legs 21-25 is a closed cooling air circuit (no cooling air is bled off) that passes through the airfoil walls and the platform to provide cooling for both of these surfaces of the blade and in the order described.

Figure 9:
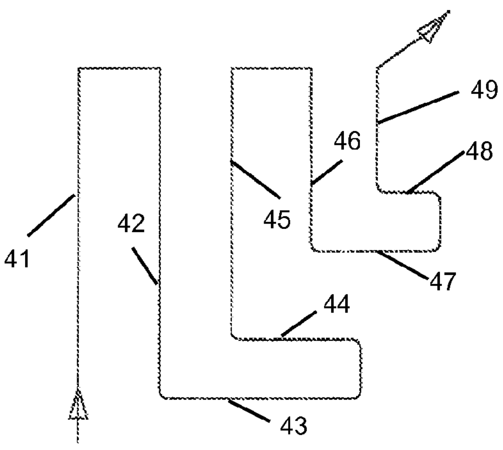
FIG. 9 shows a flow diagram for a five-pass integrated aft flowing serpentine flow circuit used in the blade of the present invention.

FIG. 9 shows another embodiment of the present invention and includes a five-pass integrated aft flowing serpentine flow cooling circuit with a first leg 41 formed in the airfoil wall as a radial flow channel, a second leg 42 as a radial flow channel in the airfoil wall, a third leg 43 and a fourth leg 44 formed in the platform, a fifth leg 45 formed in the airfoil wall as a radial channel, a sixth leg 46 formed as a radial channel in the airfoil wall, a seventh leg 47 and an eight leg 48 formed within the platform, and a ninth leg 49 formed as a radial channel in the airfoil wall. In this FIG. 9 embodiment, the serpentine circuit forms a closed path circuit with the legs formed in series in which the first leg, second leg, fifth leg, sixth leg and ninth (last) leg all are formed within the airfoil wall as a radial channel, and where the third leg, the fourth leg, the seventh leg and the eighth leg are all formed within the platform. The third and fourth legs 43 and 44 formed within the platforms connect the second leg of the airfoil wall to the fifth leg also formed within the airfoil wall. The seventh and eighth legs 47 and 48 formed within the platform connects the sixth leg 46 formed within the airfoil wall to the ninth leg 49 also formed within the airfoil wall. The ninth leg 49 is connected to an exit slot 31 to discharge the cooling air from the serpentine circuit.

Figure 10:
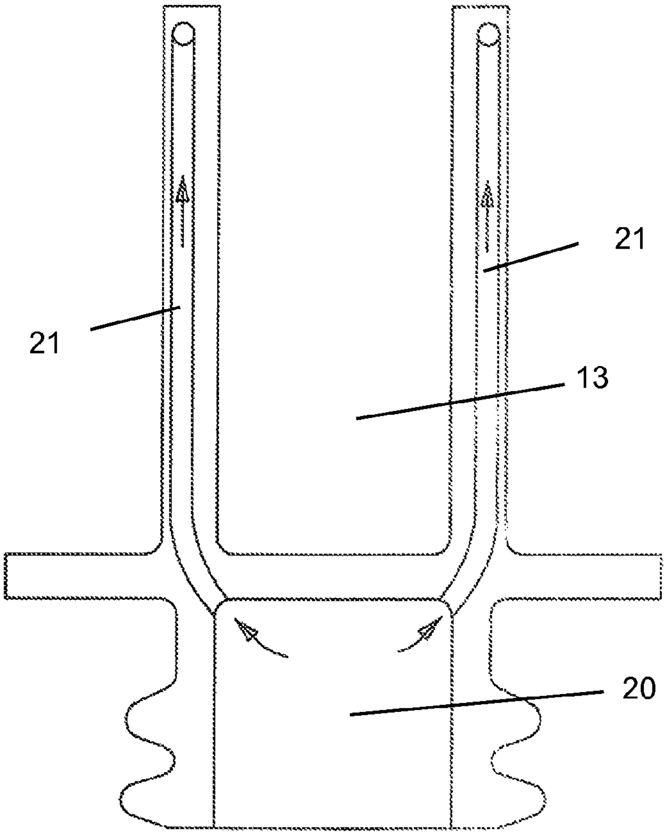
FIG. 10 shows a cross section view of the first leg for the triple pass integrated aft flowing serpentine flow circuit used in the blade of the present invention.

FIG. 10 shows a cross section of the blade with the first legs 21 of the triple pass integrated aft flowing serpentine flow circuit. The blade root contains a cooling air supply cavity 20 that is connected to the first legs 21 of the serpentine circuit that are radial channels formed in the pressure side and the suction side walls of the airfoil. The hollow cavity 13 is formed between the two airfoil walls. The first legs 21 flow up toward the tip and turn at the tip into the second leg 22 of the serpentine that is also a radial channel formed within the airfoil wall but flows downward.

Figure 11:
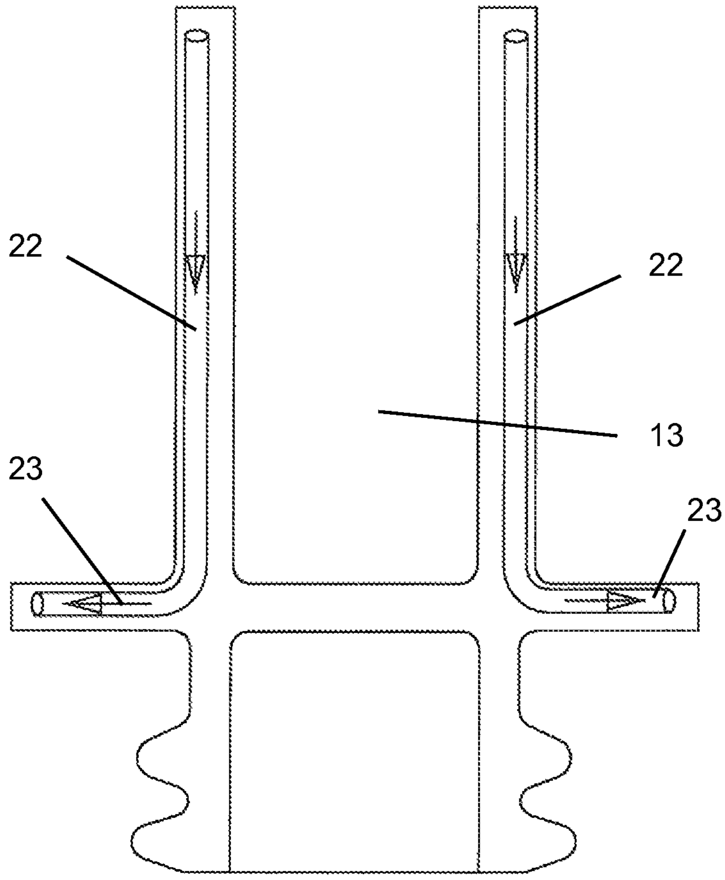
FIG. 11 shows a cross section view of the second and third legs for the triple pass integrated aft flowing serpentine flow circuit used in the blade of the present invention.
Figure 12:
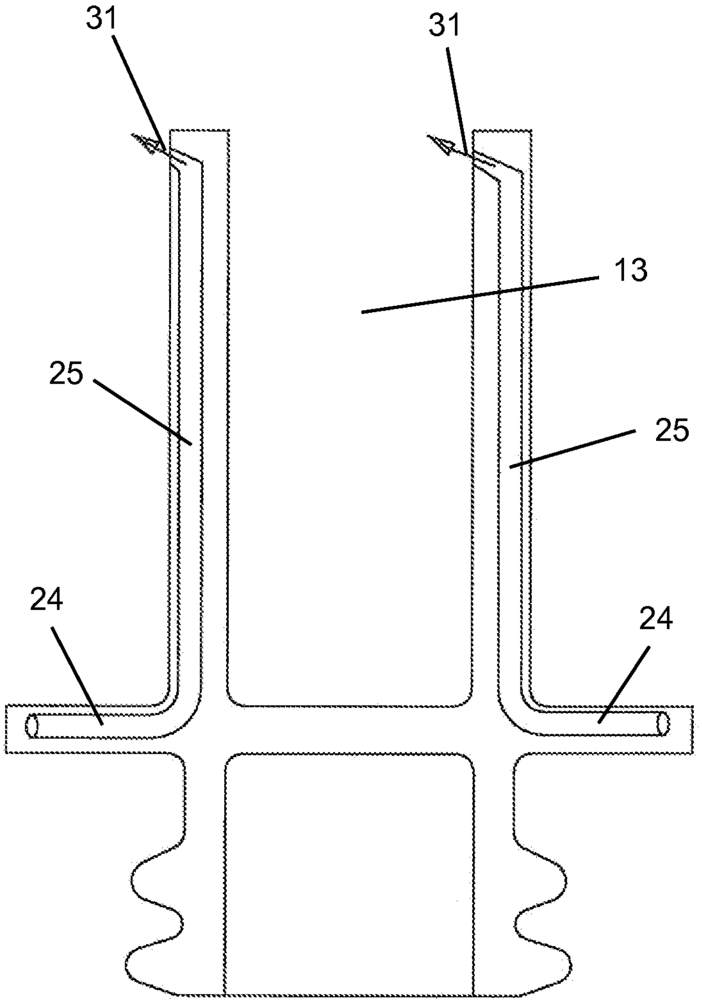
FIG. 12 shows a cross section view of the fourth and fifth legs for the five-pass integrated aft flowing serpentine flow circuit used in the blade of the present invention.

FIG. 11 shows a cross section view of the blade with the second legs 22 of the serpentine circuit that receive the cooling air from the first legs 21 in the FIG. 10 illustration. The second legs 22 flow down toward the platform and then into the legs 23 and 24 formed within the platform. FIG. 12 shows the fourth legs 24 formed within the platform that then flows into the fifth leg 25 formed as a radial channel within the airfoil wall. The fifth leg 25 discharged at the blade tip through the exit slot 31 in a direction toward the oncoming hot gas flow leakage to form a seal for the blade tip and limit the leakage flow across the tip.

Figure 13:
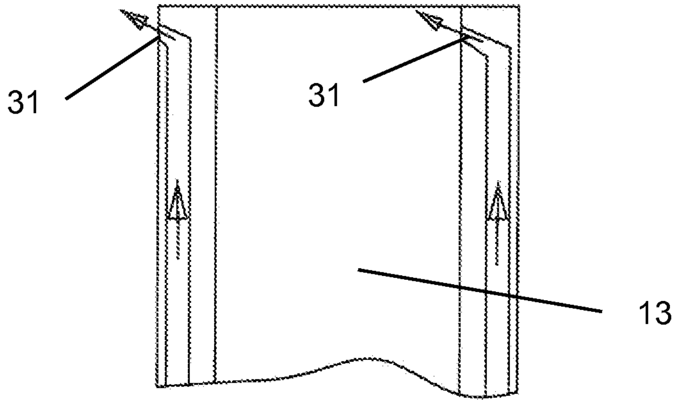
FIG. 13 shows a detailed cross section view of the blade tip section cooling air exit slot geometry of the blade of the present invention.

FIG. 13 shows a detailed view of the blade tip with the exit slots 31. The last leg of the serpentine flows up toward the tip and discharges into the exit slot 31 which includes a convergent shape in a direction of the cooling air flow from the exit slot.

The blade with the multiple-pass integrated aft flowing serpentine flow cooling circuit is intended to be used in a blade that includes a main support spar that forms the support structure for a thin thermal skin that is bonded to the spar and forms the airfoil surface of the blade. The thermal skin will be bonded to the spar by a TLP bonding process that will also enclose the radial cooling channels so that near-wall cooling of the thin thermal skin will be produced.

The multiple integrated triple pass or five-pass serpentine flow cooling circuits are constructed in a parallel forward flowing or aft flowing direction. The circuits can be formed as a three pass or five pass serpentine circuit depending on the height of the blade. Individual multiple integrated serpentine flow channels are designed based on the airfoil gas side pressure distribution for both the airfoil and the platform. In addition, each individual multiple integrated serpentine flow circuit can be designed based on the airfoil or platform local external heat load to achieve a desired local metal temperature so that an over-temperature does not occur that can cause erosion damage to the blade. With the multiple integrated triple pass or five-pass serpentine flow cooling circuits of the present invention, a maximum usage of cooling air for a given airfoil inlet gas temperature and pressure profile is achieved. Also, the multiple three-pass or five-pass serpentine flow cooling circuit yields a higher internal convection cooling effectiveness than the single pass radial flow cooling channel design of the prior art for a near-wall cooling design.

In operation, cooling air is supplied through the airfoil cooling supply cavity located in the blade attachment section. The cooling air then flows through each individual multiple triple-pass or five-pass serpentine flow circuits. The cooling air flows through the radial channels in the airfoil wall and in the sub-legs formed within the platform to provide cooling for both of these sections of the blade. The fresh cooling air will flow up and down the radial channels in the airfoil in the first two legs first before flowing into the sub-legs formed within the platform. The heated cooling air from the platform sub-legs will then flow through the last leg in a radial channel toward the blade tip and is then discharged out through the exit slots formed on the upstream side of the blade tip wall on the pressure side wall and the suction side wall to limit the hot gas flow leakage across the blade tip gap.

Due to a pressure gradient across the airfoil from the pressure side of the blade to the downstream section of the blade suction side, the secondary flow near the pressure side surface will migrate from the lower blade span upward and across the blade tip. The near-wall secondary flow will follow the contour of the pressure surface on the airfoil peripheral and flow upward and across the blade tip crown. At the same time the multiple near-wall convergent cooling channel, incorporated with a slanted convergent flow channel at pressure side surface, will accelerate the cooling air being discharged from the blade tip exit slots toward the pressure surface forming an air curtain against the on-coming hot gas leakage flow. This counter flow action will reduce the on-coming leakage flow as well as push the leakage flow outward toward the blade outer air seal (BOAS). In addition to the counter flow action, the slanted blade cooling channel forces the secondary flow to bend outward as the leakage flow enters the pressure side tip corner and yields a smaller vena contractor to therefore reduce the leakage flow area. A similar design is also used on the airfoil suction side near wall radial convergent flow channel and the airfoil trailing edge channel. The end result for these combination effects is to reduce the blade leakage flow and provide better cooling for the blade.

The formation of the leakage flow resistance by the blade near-wall cooling channels and cooling flow injection yields a very high resistance for the leakage flow path and therefore a reduction of the blade leakage flow. As a result, it reduces the blade tip section cooling flow mal-distribution and increases the blade useful life.

For construction of the spar and thermal skin cooled turbine blade of the present invention with the near wall multiple integrated triple-pass or five-pass serpentine flow cooling channels, the blade spar can be cast with a built-in mid-chord open cavity for cooling air supply. Multiple integrated triple-pass or five-pass serpentine flow channels can be machined or cast onto the spar outer surface. A thin thermal skin with built-in tip section discharge slots can be in a different material than the cast spar piece or of the same material with the spar piece, and is then bonded onto the spar through the use of transient liquid phase (TLP) bonding process. The thermal skin can be in multiple pieces or a single piece to cover the entire airfoil surface. The platform can also be formed by this process with the cooling channels machined or cast into the spar platform and then a thin thermal skin bonded over the spar platform to form the hot gas flow surface with the cooling channels formed below the thermal skin. The thermal skin can be a high temperature resistant material (more than the spar) in a thin sheet metal form with a thickness varying from around 0.010 inches to 0.030 inches. This thin wall airfoil is very difficult to form by today's lost wax casting process.

I claim the following:

1. A turbine rotor blade comprising:

a platform;

an airfoil extending from the platform;

the airfoil forming a hollow cavity open at a tip end of the airfoil;

a cooling air supply cavity formed within a root of the blade;

a multiple pass serpentine flow cooling circuit formed within a wall of the airfoil and the platform;

the multiple pass serpentine flow cooling circuit having a first leg connected to the cooling air supply cavity and forming a radial flow cooling channel in a wall of the airfoil, a last leg forming a radial flow cooling channel in the wall of the airfoil, and a middle leg formed within the platform and connecting the first leg to the last leg; and, a cooling air exit slot formed on a tip of the blade and connected to the last leg of the serpentine flow cooling circuit.

2. The turbine rotor blade of claim 1, and further comprising:

the cooling air exit slot opens on an upstream side of the tip; and, the cooling air exit slot is convergent.

3. The turbine rotor blade of claim 1, and further comprising:

the multiple pass serpentine flow cooling circuit is a triple pass serpentine flow cooling circuit formed within the wall of the airfoil with two sub-legs extending between a second leg and a third leg of the triple pass serpentine flow cooling circuit, the two sub-legs passing through the platform to provide near wall cooling to the platform.

4. The turbine rotor blade of claim 1, and further comprising:

the multiple pass serpentine flow cooling circuit is a five-pass serpentine flow cooling circuit formed within the wall of the airfoil with two sub-legs extending between the second leg and the third leg of the triple pass serpentine flow cooling circuit and two more sub-legs extending between the fourth leg and the fifth leg of the five-pass serpentine flow cooling circuit, the four sub-legs passing through the platform to provide near wall cooling to the platform.

5. The turbine rotor blade of claim 1, and further comprising:

the airfoils walls are formed with a plurality of multiple pass serpentine flow cooling circuits each with a first leg connected to the cooling air supply cavity and with a last leg connected to a cooling air exit slot that opens onto an upstream side of the blade tip on both the pressure side wall and the suction side wall of the airfoil.

6. The turbine rotor blade of claim 1, and further comprising:

the blade is formed with a spar having the radial flow cooling channels formed on an outer surface of an airfoil piece of the spar; and, a thin thermal skin bonded to the outer surface of the airfoil piece of the spar to form an airfoil surface.

7. The turbine rotor blade of claim 1, and further comprising:

the turbine rotor blade includes no film cooling holes connected to the multiple pass serpentine flow cooling circuit.

8. A turbine rotor blade comprising:

a spar having a hollow inner cavity and a cooling air supply cavity;

the spar forming a support structure for the turbine rotor blade;

a platform extending out from the spar;

a multiple pass serpentine flow cooling channels formed within an outer surface of the spar and the platform;

a thin thermal skin bonded to the spar and the platform to form an outer surface of the turbine rotor blade and the platform and to enclose the serpentine flow cooling channels; and, the serpentine flow cooling channels forms a closed cooling path from the cooling air supply cavity to a blade tip exit slot that passes through a wall of the blade and the platform to provide near wall cooling.

9. The turbine rotor blade of claim 8, and further comprising:

the blade tip exit slot opens on an upstream side of the tip; and, the blade tip exit slot is convergent.

10. The turbine rotor blade of claim 8, and further comprising:

the multiple pass serpentine flow cooling channels includes a first leg and a second leg and a last leg formed within an airfoil wall of the blade and two sub legs formed within the platform;

the first leg is connected to the cooling air supply cavity; and, the last leg is connected to the blade tip exit slot.

* * * * *